United States Patent

Krüger

Patent Number: 5,704,246
Date of Patent: Jan. 6, 1998

[54] DEVICE FOR MEASURING THE THICKNESS OF OBJECTS TO BE HANDLED IN DOCUMENT-HANDLING MACHINES

[75] Inventor: Hans-Kurt Krüger, Butzbach-Pohl Göns, Germany

[73] Assignee: Bell & Howell GmbH, Friedberg, Germany

[21] Appl. No.: 792,391

[22] Filed: Feb. 3, 1997

Related U.S. Application Data

[63] Continuation of Ser. No. 516,894, Aug. 18, 1995, abandoned, which is a continuation of Ser. No. 138,422, Oct. 20, 1993, abandoned.

[51] Int. Cl.$^6$ .................................... B21J 15/02
[52] U.S. Cl. ..................... 73/159; 271/262; 209/900
[58] Field of Search ........................ 73/159, 865.8; 33/787, 788, 706–708, 784, 806, 807, 809; 209/900, 602–604; 271/2, 258, 262, 263, 3.13; 377/24

[56] References Cited

U.S. PATENT DOCUMENTS

| | | | |
|---|---|---|---|
| 2,083,373 | 6/1937 | Hardesty et al. | 33/806 |
| 2,875,524 | 3/1959 | Bower et al. | 33/708 |
| 3,142,121 | 7/1964 | Stefanov | 377/24 |
| 3,176,981 | 4/1965 | Vandeman | 271/263 |
| 4,029,957 | 6/1977 | Betz et al. | 250/221 |
| 4,576,287 | 3/1986 | Bingham et al. | 209/601 |
| 4,610,090 | 9/1986 | Brady | |
| 4,612,656 | 9/1986 | Suzuki et al. | 377/24 |
| 4,697,246 | 9/1987 | Zemke et al. | 271/263 |
| 4,937,702 | 6/1990 | Kurihara | |
| 4,953,842 | 9/1990 | Tolmie, Jr. et al. | 271/2 |
| 5,031,464 | 7/1991 | Tholérus | 73/818 |
| 5,203,091 | 4/1993 | Al Farsy | 33/807 |

FOREIGN PATENT DOCUMENTS

| | | |
|---|---|---|
| 0225288 | 10/1987 | European Pat. Off. . |
| 0330156 | 8/1989 | European Pat. Off. . |
| 0376496A3 | 7/1990 | European Pat. Off. . |
| 2287701 | 9/1976 | France . |
| 1536513 | 1/1970 | Germany . |
| 3035774 | 5/1982 | Germany . |
| 62-206435 | 9/1987 | Japan . |
| 62-248514 | 10/1987 | Japan . |
| 9104456 | 4/1991 | WIPO . |

*Primary Examiner*—Robert Raevis
*Attorney, Agent, or Firm*—Millen, White, Zelano, & Branigan, P.C.

[57] ABSTRACT

A device for measuring the thickness of objects to be handled in mail processing machines, particularly collating machines, inserters and the like, has a relatively-stationary back-up part; a gripper jaw; a rotating axis for mounting the gripper jaw pivotably in relation to the back-up part, whereby an object to be handled is engageable between the gripper jaw and the back-up part; an actuator system operatively connected between the back-up part and the gripper jaw for generating pivotal movement of the gripper jaw between an engagement position and an open position in relation to the back-up part; a movement-transmission part fastened to the rotating axis; and, a measuring device provided operatively between the movement-transmission part and the back-up part, the measuring device providing position-detector signals corresponding to predetermined pivotal positions of the gripper jaw in relation to the back-up part. The measuring device includes a detector which is connected to an UP/DOWN-counter operated by the output signals of the detector.

15 Claims, 3 Drawing Sheets

DEVICE FOR MEASURING THE THICKNESS OF OBJECTS TO BE HANDLED IN DOCUMENT-HANDLING MACHINES

This application is a continuation of application Ser. No. 08/516,894, filed Aug. 18, 1995, which is a continuation of application Ser. No. 08/138,422 filed Oct. 20, 1993; both now abandoned.

The invention disclosed herein corresponds to that disclosed in German patent application P 42 13 262.2, the entire disclosure of which is incorporated herein by reference.

BACKGROUND OF THE INVENTION

1. Field of the Invention

The invention relates to devices for measuring the thickness of objects to be handled in mail-processing machines, collating machines, inserters and the like.

2. Related Art

It is known in the mail-processing machine art to provide a linear array of processing stations disposed lengthwise along an insert track. Such processing stations have gripper arms by which a single sheet or a plurality of sheets is drawn off from a stack of forms or documents or the like and is placed on the insert track. In this manner, in the rhythm of movement of the transport chain of the insert track past the processing stations, groups of a plurality of objects to be handled are associated together and, thereafter, are packaged in an envelope inserter station. The correct operation of the respective machine stations is supervised, for example, by detecting the thickness of the objects to be handled and thereby determining if an item to be added to a respective group is missing or if a greater number of sheets than intended has been fed to a particular group. Upon such detection, corrective steps may be taken.

Because of the variety of possible thicknesses of objects to be handled in mail processing machines or inserters, it is difficult, with known thickness measuring devices, to obtain unambiguous information with regard to the respective operational condition of the array of machine stations. Particularly, it is often necessary in systems of the prior art to carry out manual adjustments by progressing from station to station, e.g. by adjusting electrical contact sets being actuated by means of a transmission element coupled to a rotation axis of a movable gripper jaw, the adjustment being made for each station based on the nominal thickness of the object to be engaged by its gripper jaws. However, such manual adjustments must be repeated for subsequent runs wherein the nominal thickness varies from that used for the initial adjustment.

SUMMARY OF THE INVENTION

It is an object of the invention to provide an improved thickness measuring system for document-handling machines. It is a further object of the present invention to provide means for measuring the thickness of objects to be handled in mail-processing machines, collating machines, inserters, and the like, the measuring means generating measuring output signals corresponding to a predetermined range of relative positions of the gripper jaws in a continuous manner without the necessity of manual adjustment of the measuring means from machine-run to machine-run.

These and other objects, in accordance with the present invention, are achieved by a device for measuring the thickness of objects to be handled in mail processing machines, particularly collating machines, inserters and the like, having:

a relatively stationary back-up part;

a gripper jaw;

a rotating axis for mounting the gripper jaw pivotably in relation to the back-up part, whereby an object to be handled is engagable between the gripper jaw and the back-up part;

an actuator system operatively connected between the back-up part and the gripper jaw for generating pivotal movement of the gripper jaw between an engagement position and an open position in relation to the back-up part;

a movement-transmission part fastened to the rotation axis; and, measuring means provided operatively between the movement-transmission part and the back-up part, the measuring means providing position-detector signals corresponding to predetermined pivotal positions of the gripper jaw in relation to the back-up part.

The system according to the present invention provides a measuring means which comprises a measuring-signal generator including a raster gauge provided on the back-up part or movement-transmission part and extending substantially in the direction of movement of said movement-transmission part. The measuring-signal generator further includes a detector mounted on the respective other of the movement-transmission part or back-up part and arranged opposite the raster gauge for detection of the raster marks thereof. The invention further provides that the detector is connected to UP/DOWN-counter means operated by the output signals of the detector. The detector output signals are of a type which includes information regarding the direction of movement for controlling incrementation or decrementation of the UP/DOWN-counter means.

In accordance with a preferred embodiment of the invention, the movement-transmission part may comprise a lever fastened to the rotation axis of the pivotable gripper jaw and having a radial length greater than the effective radial length of the pivotable gripper jaw so that a mechanical amplification of movement representative of the gripper jaw engagement movement is achieved. The raster gauge preferably has an arched shape corresponding to the curvature of the path of movement of the distal end of the movement-transmission part and may be provided with an uninterrupted array of magnetic, optical, or fluid raster marks suitable for being scanned by the detector, which is correspondingly of a magnetic, optical or fluid type, respectively.

The output signal from the UP/DOWN-counter means may be transformed into an analog signal and, after amplification, may be fed to a voltage-controlled oscillator, the output frequency of which is a measure of the respective position of the gripper jaws. The gain of the amplifier just mentioned may by controllable by control signals from a central operating and control unit in such manner that, in a system with a series of machine stations, all voltage-controlled oscillators provide the same output frequency if the respective gripper jaws in the respective machine stations all are engaging objects with the respective nominal thickness dimension. Respective selected gain-control signals, therefore, can be a measure of the respective nominal thickness value of the objects to be handled in the respective machine stations and can be fed to display means.

It should be understood that, while the invention is herein-described in the preferred use, namely thickness measurement by means of pivotally-moved gripper arms of machine stations of mail processing machines and collating machines, the principles disclosed herein can be applied to other uses without departing from the spirit and scope of the invention. For example, the presently-disclosed principles can also be used to make thickness measurements at other locations of mail processing machines, collating machines, metering machines and similar systems. Thus, a back-up part, for example, need not necessarily be a gripper arm with an integral gripper jaw. Rather, it could be a support surface which is stationary relative to a machine frame and which cooperates with a pivotable gripper jaw in the form of a feeler arm for mechanically scanning objects therebetween, the feeler arm being fastened to a rotation axis which is firmly coupled to a movement-transmission part that transmits the pivot position information of the feeler arm to a detector system. Such position information would be, e.g., a magnitude representative of the thickness of the handled object.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating principles of the invention.

DETAILED DESCRIPTION OF THE DRAWINGS

Figure 1:
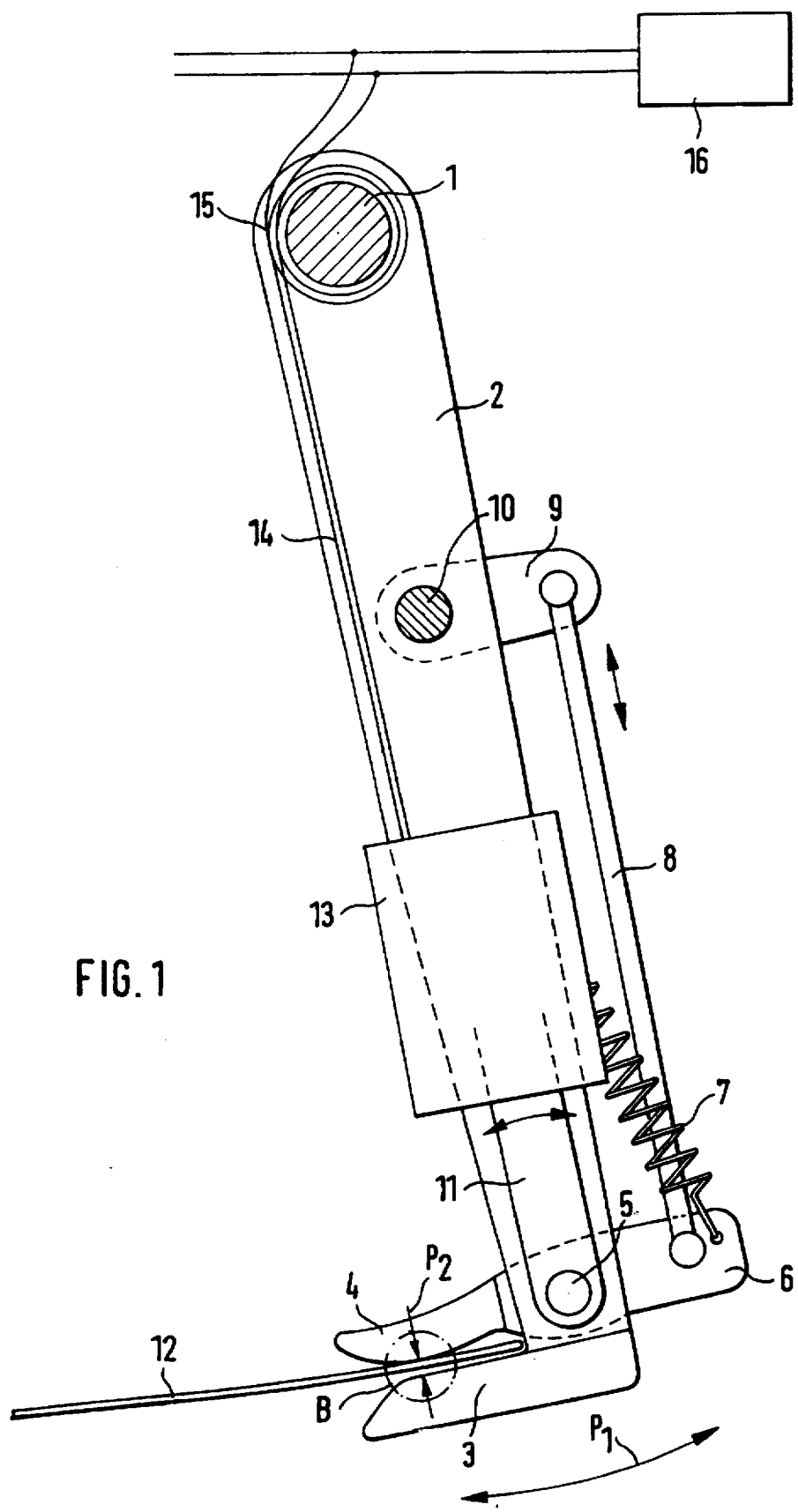
FIG. 1 is a schematic side elevation view of a gripper arm of a mail processing machine comprising measuring means in accordance with the present invention.

Referring now to FIG. 1, there is shown a pivot axis 1 and, firmly connected to the axis, a gripper arm 2 pivotably movable in the direction of the double arrow P1. From the lower end of the gripper arm 2, integrally therewith and transverse to its length direction, a gripper jaw 3 protrudes, that gripper jaw forming a back-up part of a gripper jaw arrangement. Opposite the gripper jaw 3 there is provided a gripper jaw 4 firmly connected to a rotation axis 5 and being mounted pivotally on the rotation axis at the lower end of the gripper arm 2. A rear extension 6 of gripper jaw 4 extends from the rear side of gripper arm 2 remote from the side of the gripper mouth between the jaws. The extension 6 serves to bias the pivotable gripper jaw 4 by means of a tension spring 7 and to actuate gripper jaw 4 by means of an actuating rod 8, an actuating lever 9, and a driving axis 10 extending in parallel with the pivot axis 1. Details of this mechanism are well known to the man skilled in the art and, therefore, need no further description. Fastened to the rotation axis 5 is a lever 11 forming the movement-transmission part. In the position shown in FIG. 1, the lever 11 extends substantially in a direction along the length of the gripper arm 2. And, thus, it is oriented in a predetermined angle of, e.g., 90 degrees with respect to the direction of the length of the gripper jaw 4.

The effective length of the pivotable gripper jaw 4, namely the radial distance of the contact region adjacent the arrows P2 from the rotation axis 5, is smaller than the length of the lever 11 so that the free end of the lever 11 makes correspondingly greater arcuate movements than the pivotable gripper jaw 4 in the region B when the gripper jaw arrangement is opened and closed, respectively. This results in an improvement with regard to accuracy and resolution in the measuring device of the present invention. Under the operational conditions shown in FIG. 1, there is a paper sheet 12 of known thickness engaged between the gripper jaws 3 and 4, the sheet of paper being the object to be handled and having been drawn off from the lower end of a form stack. The sheet of paper 12, by being interposed between the gripper jaws 3 and 4 in region B, causes a predetermined pivot position of the pivotable gripper jaw 4 and, thereby, a corresponding pivot position of the free end of the lever 11. This position is detected by means of a detector in the form of a measuring signal generator 13 fastened to the gripper arm 2 and being shown schematically in FIG. 1. For this purpose, the free end of the lever 11 extends into the measuring signal generator 13 as shown in FIG. 1.

Starting from the measuring signal generator 13, signal lines 14 are installed lengthwise with respect to the gripper arm 2 and are coupled to flexible connector means 15 which, in turn, have connection to processing means generally indicated by block symbol 16. The signal lines 14, in operation, provide signals which, within a predetermined range of positions of the gripper jaws 3 and 4 in relation to each other, correspond substantially continuously to the respective gripper positions so that it is not necessary to carry out manual adjustments at the gripper arm 2 or at the measuring signal generator 13 if, from run to run of the respective system, the thickness of the object 12 to be handled should change. This is explained in more detail below.

Figure 2:
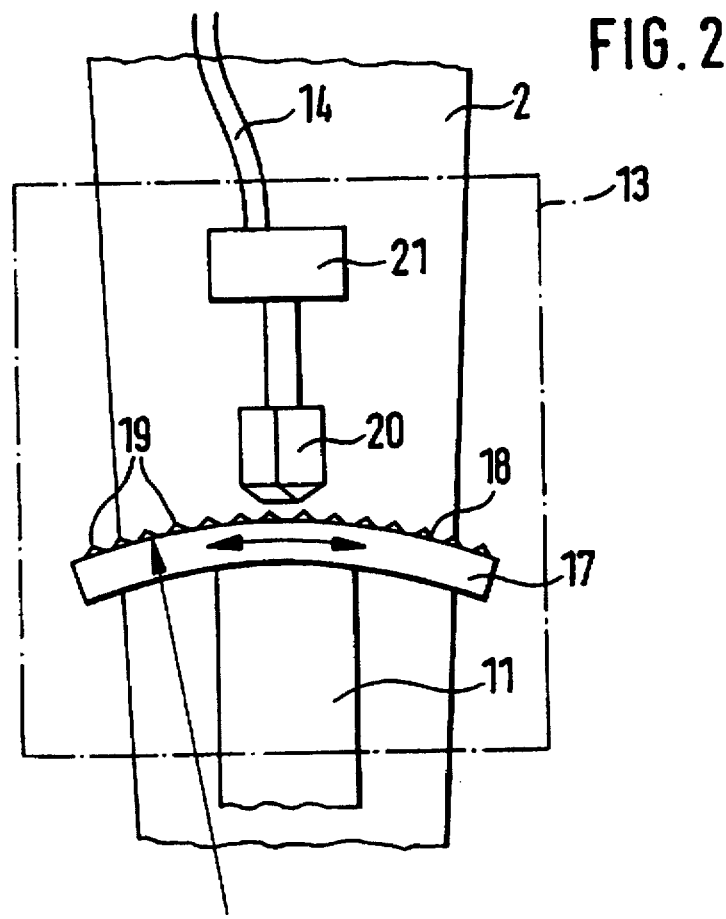
FIG. 2 is a fragmentary view of the gripper arm of FIG. 1 in the region of the measuring means for illustrating a first embodiment of the invention.

In the embodiment of the measuring signal generator 13 shown in FIG. 2 of the drawings, a raster gauge 18 is fastened to the free end of the lever 11 and is positioned on a carrier 17. The raster gauge 18 extends on the carrier along a narrow cylindrical surface which is coaxial to the rotation axis 5 of the pivotable gripper jaw 4 and, therefore, coaxial to the rotation axis of the lever 11. The raster gauge 18 comprises an array of raster marks or line-shaped marks 19 having equal circumferential distance from each other, e.g., in shape of magnetic marks on a section of magnetic tape or in shape of optical marks of a line raster or bar code mark raster or in shape of ridge-like protrusions as fluidically-active elements or the like.

A pair of detectors 20 is installed on the gripper arm 2 facing the raster gauge and cooperating therewith. The pair of detectors serves to detect the raster marks 19 and, depending upon the particular type of raster marks, have the form of magnetic reading heads or photocells or fluidic elements. The difference in the placement of the detectors 20 with respect to the carrier 17 is selected so that the detector output signals, with regard to the spatial period of the raster marks 19, have an effective 90-degree phase shift in the circumferential direction so that, by combining the detector output signals, direction information can be obtained in known manner. The output signals of the pair of detectors 20 are fed to an electrical circuit 21 which is part of the measuring signal generator 13. The output signals are conducted away from the gripper arm 2 via the signal lines 14. Details of the circuit 21 are described below with reference to FIG. 4.

Figure 3:
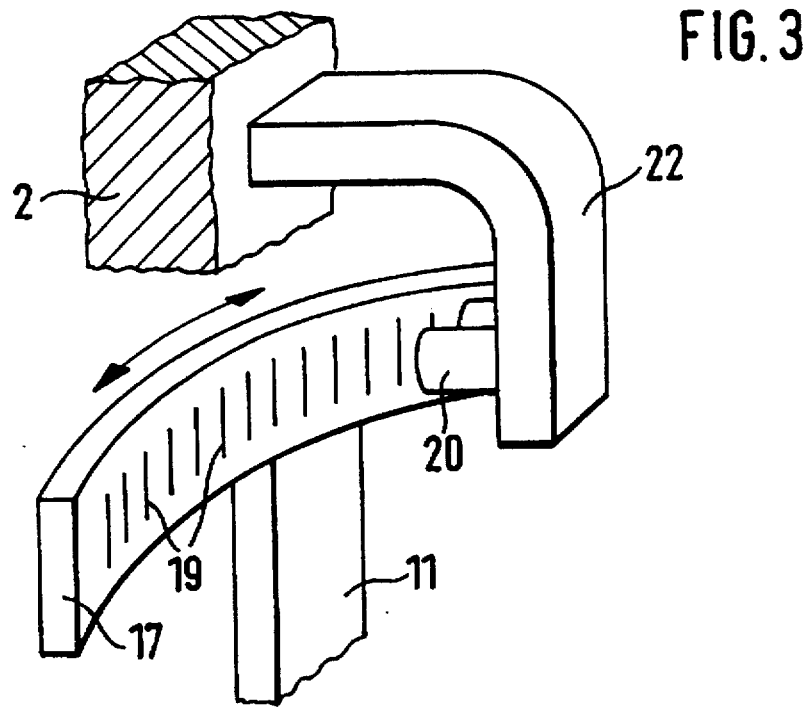
FIG. 3 is a schematic isometric view of a part of the measuring means of this invention in accordance with a further embodiment; and, FIG. 4 is a schematic circuit diagram of a preferred embodiment of the present invention.

Arranging the raster gauge 18 on a narrow cylindrical surface coaxial with the rotation axis 5 in accordance with FIG. 2 may cause problems if, after an extended operation period, the position of the rotation axis 5 in relation to the pivot axis 1 of the gripper arm 2 changes by wear effects and, thereby, a corresponding variation of the distance between the raster marks 19 and the detectors 20 in radial direction takes place. In such cases an embodiment in accordance with FIG. 3 of the drawings can be advantageous. In that embodiment, the raster marks 19 are provided on an axial front surface of a ring segment forming the carrier 17, the embodiment further having the pair of detectors 20 arranged in an axial direction facing the raster marks 19. To this end, the detectors are mounted on a bracket 22 firmly connected to the gripper arm 2. A backlash of the rotation axis 5 in the bearings in relation to the gripper arm 2 increasing after an extended operation period does not substantially influence the distance between the detectors 20 and the ring-shaped raster gauge in the embodiment of FIG. 3.

Figure 4:
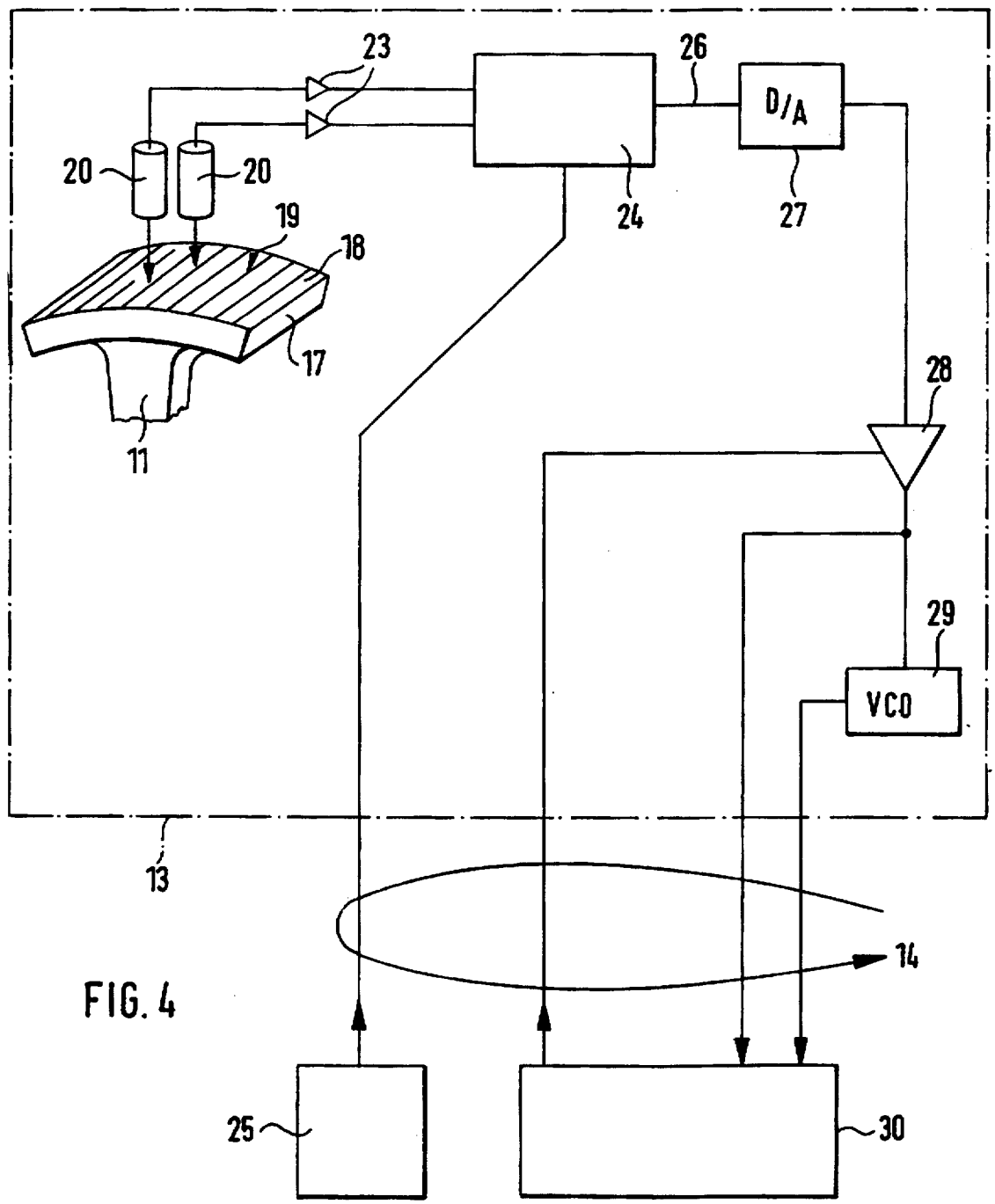

In FIG. 4, details of the measuring signal generator 13 are shown partly schematically and partly in block symbols. The pulses generated by scanning of the raster marks 19 of the raster gauge 18 during limited pivotal movements of the lever 11 around the rotation axis 5 have a mutual 90-degree phase shift. These pulses are amplified in amplifiers 23 and, thereafter, are fed to an UP/DOWN-counter 24. The counter comprises a pulse-former not shown in detail herein.

Referring to the operational positions of the components of the device shown in FIG. 1 and FIG. 4, the arrangement can be such that the UP/DOWN-counter 24 increments its count for pivotal movement of the lever 11 in clockwise direction and, therefore, for an opening movement of the pivotable gripper jaw 4. The UP/DOWN-counter 24 correspondingly decrements its count for opposite movement of the lever 11 and of the raster gauge 18 firmly connected thereto. The UP/DOWN-counter 24 is connected, via one of the signal lines 14, to a control signal source 25 which is positioned at a predetermined location of a mail processing machine or the like and provides read-out control signals for the counter 24 in such manner that the instantaneous count is presented on an output line 26 of the UP/DOWN-counter 24 while the device is in a predetermined operational condition.

In the present embodiment, the predetermined operational condition is fulfilled when the gripper arm 2 has an instantaneous position in which the gripping operation between the gripper jaws 3 and 4 is terminated. For generation of the read-out control pulses one may detect the pivot position of the pivot axis 1, whereby pulses characterizing a predetermined time interval or time window are obtained. These pulses serve to control the read-out of the UP/DOWN-counter means 24.

The count signal read-out within the time window is fed via line 26 to a D/A-transducer 27 and, therefrom, via a controllable amplifier 28, to the control input of a voltage-controlled oscillator 29. The voltage-controlled oscillator 29, via a further one of the signal lines 14, provides a signal for an operation and control unit 30, the signal having a frequency which is a measure of the read-out count of the UP/DOWN-counter 24 and, therefore, is a measure of the mutual position of the gripper jaws 3 and 4 during the read-out time interval or time window.

Another one of the signal lines 14 conducts the output signals of the controllable amplifier 28, i.e. the amplified analog signal from the output of the D/A transducer 27, to the operation and control unit 30 for display thereof or further processing if such processing is desirable for special uses or for the operation of special systems.

In accordance with an advantageous embodiment, a control signal for adjusting the gain of amplifier 28 can be fed to the amplifier via a fourth of the signal lines 14 in such manner that, proceeding from machine station to machine station, all voltage-controlled oscillators 29 of the devices of the present kind provided in the respective machine stations generate equal frequencies if objects to be handled with nominal thicknesses are respectively engaged between the gripper jaws 3 and 4. The nominal, thicknesses are, for a special machine run, different from machine station to machine station. This means that the output signal of the voltage-controlled oscillators 29 in each one of the machine stations, by the respective output signal of equal frequency, indicates that the gripper jaws respectively engage an object of nominal thickness; and each of the control signals fed to the amplifiers 28 of the respective devices from the operation and control unit 30, by the respective magnitude, gives information with regard to the magnitude of the nominal thickness and can be displayed correspondingly.

For adjusting a system with a plurality of machine stations before a regular machine run, objects to be handled having respective nominal thicknesses each are positioned between the gripper jaws. The gripper arms 2 are then moved into the read-out position and the counts of the respective UP/DOWN-counter 24, after having been transformed into analog signals in transducer 27, are processed by respective adjustment of the gain in amplifier 28 in such manner that all the voltage-controlled oscillators 29 finally generate output signals of equal frequency.

The amplifier control signals necessary for this special machine run for adjusting the amplifiers 28 can be previously-stored and made available in the operation and control unit 30, as can be other sets of amplifier control signals for other machine runs, so that a rapid change of the whole system from a run under one condition to a run under a next, different condition with different sets of nominal thicknesses of the objects to be handled, is possible. An adjustment undertaken in the unit 30, in most cases, can be limited to supervising the correctness of conditions.

The output signal from the voltage-controlled oscillators 29 can be further processed for alarm signal generation and, as the case may be, for switching off the whole system, if necessary. Since the output signals of the voltage-controlled oscillators 29 in the embodiment of the circuit described above all have the same frequency, for further processing of such output signals in the respective machine stations similar circuits and circuit components can be used whereby the whole circuitry is simplified and production costs are decreased.

While the invention has been particularly shown and described with reference to preferred embodiments thereof, it will be understood by those skilled in the art that various changes in form and details may be made therein without departing from the spirit and scope of the invention.

The embodiments of the invention in which an exclusive property or privilege is claimed are defined as follows:

1. A mail-processing device for measuring the thickness of documents to be engaged between a relatively stationary back-up part and a pivotable gripper jaw of a mail-processing machine having a plurality of processing stations, said device comprising:

A measuring signal generator for prodding position-detector signals corresponding to predetermined positions of said gripper jaw in relation to said back-up part, said measuring signal generator further comprising:

A raster gage having raster marks for providing a reference by which relative movement between said relatively stationary back-up part and said pivotable gripper jaw of said mail-processing machine can be measured;

A detector assembly mounted opposite said raster gage for detecting said raster marks, said detector assembly being adapted to produce output signals including information regarding the direction of said relative movement, said output signals comprising a train of electrical pulses;

An UP/DOWN-counter operatively connected to said detector assembly such that said output signals of said detector assembly control incrementation or decrementation of said UP/DOWN-counter;

means for reading a count of said UP/DOWN counter out from said counter as an indication of the thickness of said documents;

means for using said count to produce an output frequency corresponding to the position of said gripper jaw relative to said back-up part; and, means for controlling said output frequency to make said output frequency the same as other output frequencies from other respective processing stations which engage respective documents having respective nominal thicknesses.

2. The device according to claim 1, further comprising:

a rotating axis for mounting said gripper jaw pivotably in relation to said back-up part, whereby an object to be handled is engagable between said gripper jaw and said back-up part;

an actuator system operatively connected between said back-up part and said gripper jaw for generating pivotal movement of said gripper jaw between an engagement position and an open position in relation to said back-up part; and, a movement transmission part fastened to said rotation axis.

3. The device according to claim 2, wherein said movement-transmission part comprises a lever fastened to said rotating axis of said pivotable gripper jaw.

4. The device according to claim 3, wherein said lever has greater radial length than an effective radial length of said pivotable gripper jaw.

5. The device according to claim 2, wherein said raster gauge has an arched shape corresponding to a curvature of a path of movement of an end of said movement-transmission part remote from said rotating axis.

6. The device according to claim 1, wherein said raster gauge comprises an uninterrupted array of magnetic raster marks suitable for non-contact scanning and wherein said detector assembly comprises a magnetic detector.

7. The device according to claim 1, wherein said raster gauge comprises an uninterrupted array of optical raster marks suitable for non-contact scanning and wherein said detector assembly comprises an optical detector.

8. The device according to claim 1, wherein said raster gauge comprises an uninterrupted array of fluidically-effective raster marks suitable for non-contact scanning and wherein said detector assembly comprises a fluidic detector.

9. The device according to claim 1, wherein said detector comprises a measuring-signal transformer for transforming detector output signals into electric pulses, for amplifying said pulses, and for feeding amplified pulses to said UP/DOWN-counter.

10. The device according to claim 1, wherein a count of said UP/DOWN-counter is read out from said counter within a time interval corresponding to one machine cycle based on interrogation-control signals defining said time interval.

11. A method of measuring the thickness of documents to be engaged between a relatively stationary back-up part and a pivotable gripper jaw of a mail-processing machine having a plurality of processing stations, said method including the steps of:

using a raster gage to detect raster marks and generate a train of pulsed position signals corresponding to predetermined amounts of motion of said pivotable gripper jaw relative to said back-up part and indicating the direction of said motion;

delivering said position signals to an UP/DOWN-counter to control incrementation or decrementation of said UP/DOWN-counter and generate a digital signal representative of the state of said UP/DOWN-counter at any given time;

transforming said digital signal to an analog signal;

amplifying said analog signal;

delivering said amplified signal to a voltage-controlled oscillator for producing an output frequency corresponding to the position of said gripper jaw relative to said back-up part; and, controlling said output frequency to make said output frequency the same as other output frequencies from other respective processing stations which engage respective documents having respective nominal thicknesses.

12. The method of claim 11 for use in a mail-processing machine having a plurality of processing stations each having a thickness-measuring mechanism for practicing the method of claim 11 wherein said controlling step comprises the steps of:

using a gain-control signal to control the gain of said amplified signals at each processing station so that each voltage-controlled oscillator at each of said plurality of processing stations has an output frequency that is the same as the output frequency at each other processing station which engages a document having a nominal thickness.

13. The method of claim 12 including the step of: delivering said gain-control signals from said processing stations to respective displays for displaying a representation of the nominal thickness of documents to be measured at the respective processing stations.

14. The method of claim 13 including the step of: storing each of said gain-control signals in a storage device.

15. A mail-processing device for measuring the thickness of documents to be engaged between a relatively stationary back-up part and a gripper jaw of a mail-processing machine having a plurality of processing stations, said device comprising:

A measuring signal generator for providing position-detector signals corresponding to predetermined positions of said gripper jaw in relation to said back-up part, said measuring signal generator further comprising:

A raster gage having raster marks for providing a reference by which relative movement between said relatively stationary back-up part and said gripper jaw of said mail-processing machine can be measured;

A detector assembly mounted opposite said raster gage for detecting said raster marks, said detector assembly being adapted to produce a train of pulsed output signals including information regarding the direction of said relative movement;

An UP/DOWN-counter operatively connected to said detector assembly such that said output signals of said detector assembly control incrementation or decrementation of said UP/DOWN-counter;

means for using said count to produce an output frequency corresponding to the position, of said gripper jaw relative to said back-up part;

means for controlling said output frequency to make said output frequency the same as other output frequencies from other respective processing stations which engage respective documents having respective nominal thicknesses; and, an actuator system operatively connected between said back-up part and said gripper jaw for generating movement of said gripper jaw between an engagement position and an open position in relation to said back-up part.

* * * * *